United States Patent Office 3,412,114
Patented Nov. 19, 1968

3,412,114
PROCESS FOR PREPARING 2,5-DIENOIC ACIDS AND THE ESTERS THEREOF
Hans Fernholz, Bad Soden, Taunus, and Ludwig Schläfer, Sulzbach, Taunus, Germany, assignors to Farbwerke Hoechst Aktiengesellschaft vormals Meister Lucius & Bruning, Frankfurt am Main, Germany, a corporation of Germany
No Drawing. Filed July 21, 1964, Ser. No. 384,253
Claims priority, application Germany, July 27, 1963, F 40,355
8 Claims. (Cl. 260—404)

ABSTRACT OF THE DISCLOSURE

A process has been provided for preparing 2,5-dienoic acid and esters of the formula $$R-CR_1=CR_2-CH_2-CH=CH-COOR_3$$

by reacting unsaturated chlorocarbonic esters of the formula $$R-CR_1=CR_2-CH_2-OCOCl$$

wherein R is hydrogen or a hydrocarbon radical from 1 to 20 carbon atoms containing also inert substituents, $R_1$ and $R_2$ each represent a hydrogen atom or an alkyl group from 1 to 5 carbon atoms or 5 to 6 member isocyclic ring. The reaction is carried out in the presence of nickel carbonyl or finely divided nickel at a temperature from 10 to 80° C. and in the presence of acetylene, carbon monoxide and a compound of the formula $R_3OH$ wherein $R_3$ is a hydrogen, saturated linear or branched aliphatic radical or a cycloaliphatic radical having at least 5 carbon atoms in the ring and araliphatic radicals having 6 carbon atoms in the ring, the total number of carbon atoms being 20. A suitable range of nickel carbonyl compound is 0.02 to 0.3 mol of nickel carbonyl per mol of chlorocarbonic ester.

---

The present invention provides a process for preparing 2,5-dienoic acids and the esters thereof.

It is known to prepare 2,5-dienoic acids and the esters thereof having the general formula $$R-CR_1=CR_2-CH_2-CH=CH-COOR_3$$

by reacting $\alpha,\beta$-unsaturated chlorides of the formula $$R-CR_1=CR_2-CH_2Cl$$

with acetylene, carbon monoxide and a hydroxyl compound of the formula $R_3OH$ in the presence of nickel carbonyl, or finely divided nickel. In the formulae R stands for a hydrogen atom or a hydrocarbon radical with 1–20 carbon atoms which may contain reaction inert substituents, for example the groups —CN, —OCOCH₃ or —COOCH₃, $R_1$ and $R_2$ each represent a hydrogen atom, an alkyl group with 1–5 carbon atoms or members of a five- or six-member isocyclic ring, and $R_3$ is a hydrogen atom or a saturated linear or branched aliphatic, cycloaliphatic or araliphatic radical having 1–20 carbon atoms and mostly consisting only of carbon atoms and hydrogen atoms. It is likewise known that, instead of the $\alpha,\beta$-unsaturated chlorides, mixtures of $\alpha,\beta$-unsaturated alcohols and hydrochloric acid can be used, provided that under the reaction conditions applied $\alpha,\beta$-unsaturated chlorides of the above formula are formed as intermediate products. Furthermore, it has been proposed to prepare 2,5-hexadienoic acid-(1) methyl ester by reacting a mixture of methylallyl ether and hydrochloric acid or allyl chloride with acetylene, carbon monoxide and methanol in the presence of nickel carbonyl. In this case, too, the formation of allyl chloride in situ can be assumed.

It has now been found that 2,5-dienoic acids and the esters thereof having the above formula can be prepared in a more advantageous manner by reacting, instead of $\alpha,\beta$-unsaturated chlorides, chlorocarbonic esters of the formula $$R-CR_1=CR_2-CH_2-OCOCl$$

with acetylene, carbon monoxide and a hydroxyl compound $R_3OH$ in the presence of nickel carbonyl and/or finely divided nickel. In the formulae R, $R_1$, $R_2$ and $R_3$ have the same meaning as defined above. In view of the theoretical idea about the reaction mechanism leading to the formation of 2,5-dienoic acids and the esters thereof the results obtained are surprising and could not have been foreseen. The advantages of the present process using $\alpha,\beta$-unsaturated chlorocarbonic esters as starting material over the known processes mainly reside in a considerable improvement of the yield and a reduction of the amount of nickel carbonyl required.

It is of advantage to carry out the process of the invention with an excess of carbon monoxide and acetylene of at least 20% by weight each, calculated on the amount of the chlorocarbonic ester used, the ratio by volume of carbon monoxide to acetylene preferably being in the range of from 10:6 to 10:10 parts. A very large excess of carbon monoxide and acetylene over the chlorocarbonic ester has no detrimental effect; however, it is avoided in most cases for economical reasons.

The hydroxyl compound $R_3OH$ is advantageously used in an excess, too, which amounts to at least 50% by weight, calculated on the amount of chlorocarbonic ester used. In case the hydroxyl compound is an alcohol, the excess may simultaneously serve as diluent or solvent. When water is used as reactant it is appropriate to use a suitable reaction-inert solvent, for example acetone.

The amount of nickel carbonyl required for catalyzing the reaction is in the range of from 0.02 to 0.3, preferably 0.05 to 0.2 mol for 1 mol of chlorocarbonic ester. When finely divided nickel is simultaneously used this amount can be further reduced. It is suitable to use the nickel carbonyl in the form of its solutions in the respective solvent used. When finely divided nickel is used as sole catalyst an addition of thiourea proves to be advantageous.

Chloroformic acid esters or chlorocarbonic esters can be produced easily and with a practically quantitative yield by reacting alcohols with phosgene. Chlorocarbonic esters which can be used in the process of the invention are, for example, the esters of the following $\alpha,\beta$-unsaturated alcohols: allyl alcohol, methallyl alcohol, crotyl alcohol, 3,3-dimethylallyl alcohol, tiglyl alcohol, 2-ethylallyl alcohol, 3-ethylallyl alcohol, 3-propylallyl alcohol, 3-isopropylallyl alcohol, 2-methylpentene-(2)-ol-(1), 3,3-diethylallyl alcohol, 2,3,3-trimethylallyl alcohol, 3-cyclopentylallyl alcohol, 3-cyclohexylallyl alcohol, undecene-(2)-ol-(1), cinnamyl alcohol, p-chlorocinnamyl alcohol, p-methoxycinnamyl alcohol, p-acetoxy-cinnamyl alcohol, p-cyano-cinnamyl alcohol, cyclopentene-(1)-ol-(3), cyclohexene-(1)-ol-(3), 1-hydroxymethylcyclohexane-(1), or 4-cyanobutene-(2)-ol-(1).

Compounds of the type $R_3OH$ suitable of being reacted are water and saturated alcohols of the aliphatic, cycloaliphatic or araliphatic series with up to 20 carbon atoms in a straight or branched chain. There are specified by way of example methanol, ethanol, isopropanol, n-butanol, isobutanol, n- and isopentanols, n- and isohexanols, isooctanol, n-decanol, n-dodecanol, n-hexadecanol, n-octadecanol, cyclopentanol, and cyclohexanol as well as the homologs of the said cyclic alcohols, for example methylcyclohexanols; furthermore benzyl alcohol, p-chlorobenzyl alcohol, p-anisyl alcohol and other benzyl alcohols carrying reaction-inert groups in the nucleus and the homologs thereof.

The reaction is advantageously carried out at a temperature in the range of from 10 to 80° C., preferably 20 to 60° C. In general, the reaction is performed at atmospheric pressure. The application of superatmospheric pressure or subatmospheric pressure is likewise possible, however, this does not offer any particular advantage.

Besides acetone, already mentioned above, other ketones can be used as solvents, for example methylethyl ketone, or acyclic or cyclic ethers such as diethyl ether, dioxane or tetrahydrofurane. When the chlorocarbonic esters are reacted with water to yield the respective 2,5-dienoic acids the solvent used shall be wholly or substantially miscible with water. In case alcohols are reacted with chlorocarbonic esters to yield esters of 2,5-dienoic acids it is often not necessary to add an additional solvent, provided that a sufficient excess of the alcohol is used. However, in some cases the concomitant use of one of the aforesaid solvents may be advantageous in this case, too.

The reaction can be carried out either discontinuously or continuously.

Advantageously a mixture consisting of the hydroxyl compound $R_3OH$ to be reacted, part of the amount of nickel carbonyl to be used and a reaction-inert diluent or solvent, if any is introduced into a reaction vessel and, while stirring and passing through a gas current of carbon monoxide and acetylene, the chlorocarbonic ester to be reacted and the residual amount of nickel carbonyl, preferably dissolved in the same solvent, are added to the mixture.

The products obtained by the process of the invention can be used as monomers for the manufacture of polymerization products, as plasticizers, solvents or intermediates. 2,5-hexadienoic acid and the esters thereof can be converted into sorbic acid by known methods by an alkaline treatment.

The following examples serve to illustrate the invention but they are not intended to limit it thereto.

Example 1

A mixture was prepared from 600 cc. of acetone, 50 cc. of water and 3 cc. of nickel carbonyl. The atmospheric oxygen was removed by the introduction of nitrogen. While stirring at 35–45° C. a solution of 121 grams of chlorocarbonic allyl ester in 100 cc. of acetone and a solution of 10 cc. of nickel carbonyl in 60 cc. of acetone were dropped in over a period of 5 hours. Simultaneously, 12 l./hr. of carbon monoxide and 12 l./hr. of acetylene were introduced. The reaction mixture was then allowed to stand for about 12 hours at room temperature. Nitrogen was passed through in order to remove carbon monoxide and acetylene, the mixture was filtered and subjected to fractional distillation. 102 grams of 2,5-hexadienoic acid-(1) were obtained having a boiling point of 102–104° C. under a pressure of 11 mm. of mercury.

Example 2

121 grams of chlorocarbonic allyl ester dissolved in 100 cc. of acetone were dropped at 35–45° C. over a period of 6 hours into an intensely stirred mixture of 600 cc. of acetone, 50 cc. of water, 4 cc. of nickel carbonyl and 60 cc. of moist Raney nickel. Simultaneously, 20 l./hr. of carbon monoxide and 16 l./hr. of acetylene were introduced. After purging with nitrogen the reaction mixture was filtered and subjected to fractional distillation. 94 grams of 2,5-hexadienoic acid-(1) were obtained.

Example 3

121 g. of chlorocarbonic allyl ester in 100 cc. of acetone and 13 cc. of nickel carbonyl in 50 cc. of methanol were dropped over a period of 7 hours while stirring at 40° C. into a solution of 5 cc. of nickel carbonyl in 600 cc. of methanol. Simultaneously, 10 l./hr. of carbon monoxide and 10 l./hr. of acetone were introduced. After having purged with nitrogen, the reaction mixture was filtered and methanol and acetone were distilled off at atmospheric pressure. 500 cc. of water were added to the residue. The aqueous mixture was exhaustively extracted with either. After having dried over sodium sulfate the ether was evaporated and the residue was subjected to fractional distillation. 114 grams of 2,5-hexadienoic acid-(1) methyl ester were obtained having a melting point of 62–64° C. under a pressure of 30 mm. of mercury.

Example 4

121 grams of chlorocarbonic allyl ester in 100 cc. of acetone were dropped over a period of 12 hours at 40–50° C. into an intensely stirred mixture of 500 cc. of ethyl alcohol, 100 cc. of Raney nickel and 16 grams of thiourea. Simultaneously, 10 l./hr. of carbon monoxide and 6 l./hr. of acetylene were introduced. The mixture was allowed to stand for 12 hours at room temperature, filtered and further processed as described in Example 3. 104 grams of 2,5-hexadienoic acid-(1) ethyl ester were obtained having a boiling point of 58–62° C. under a pressure of 12 mm. of mercury.

Example 5

121 grams of chlorocarbonic allyl ester in 100 cc. of acetone and 10 cc. of nickel carbonyl in 50 cc. of acetone were dropped, while stirring at 40° C. over a period of 8 hours and passing through a gas current of 10 l./hr. of carbon monoxide and 8 l./hr. of acetylene, into a mixture of 300 cc. of benzyl alcohol, 300 cc. of acetone and 5 cc. of nickel carbonyl. The reaction mixture was further processed as described in Example 3. 122 grams of 2,5-hexadienoic acid-(1) benzyl ester were obtained having a boiling point of 158–162° C. under a pressure of 15 mm. of mercury.

Example 6

91 grams of chlorocarbonic crotyl ester in 80 cc. of acetone and 10 cc. of nickel carbonyl in 60 cc. of acetone were dropped, while stirring at 40° C. over a period of 6 hours, into a mixture of 500 cc. of acetone, 50 cc. of water and 4 cc. of nickel carbonyl. Simultaneously, 20 l./hr. of carbon monoxide and 20 l./hr. of acetylene were introduced. The reaction mixture was further processed as described in Example 1. 105 grams of heptadienoic acid-(1) were obtained having a boiling point of 119–121° C. under a pressure of 12 mm. of mercury.

Example 7

A solution of 91 grams of chlorocarbonic methallyl ester in 100 cc. of acetone and a solution of 8 cc. of nickel carbonyl in 50 cc. of acetone were dropped over a period of 10 hours, while intensely stirring at 40–50° C., into a mixture of 500 cc. of acetone, 50 cc. of water, 3 cc. of nickel carbonyl and 50 cc. of Raney nickel. Simultaneously, 20 l./hr. of carbon monoxide and 20 l./hr. of acetylene were passed through.

When the reaction was terminated, the reaction mixture was purged with nitrogen and filtered. The acetone was substantially evaporated. The residue was taken up in ether, washed with water and dried over $Na_2SO_4$. The fractional distillation yielded 112 grams of 5-methyl-2,5-hexadienoic acid-(1) having a boiling point of 109–111° C. under a pressure of 12 mm. of mercury.

Example 8

10 l./hr. of carbon monoxide and 10 l./hr. of acetylene were introduced into a stirred mixture of 200 cc. of methanol, 2 cc. of nickel carbonyl and 30 cc. of Raney nickel. Simultaneously, a solution of 53 grams of the chlorocarbonic ester of 4-cyano-2-butene-ol-(1) in 100 cc. of acetone was dropped in at 40–50° C. over a period of 4 hours. When the reaction was terminated the reaction mixture was filtered and methanol and acetone were substantially evaporated at atmospheric pressure. 200 cc. of water were added to the residue. The mixture was exhaustively extracted with ether and the ethereal extract was dried over $Na_2SO_4$. After evaporation of the ether the reaction product was distilled under reduced pressure. 49 grams of 7-cyano-2,5-heptadienoic acid-(1) methyl ester were obtained having a boiling point of 139–143° C. under a pressure of 12 mm. of mercury.

Example 9

A solution of 50 grams of chlorocarbonic cinnamyl ester in 200 cc. of acetone was dropped over a period of 6 hours, while stirring at 50° C. and passing through 8 l./hr. of carbon monoxide and 8 l./hr. of acetylene, into the mixture specified in Example 8. The reaction mixture was further processed as described in Example 8. 36 grams of 6-phenyl-2,5-hexadienoic acid-(1) methyl ester were obtained having a boiling point of 151–156° C. under a pressure of 3 mm. of mercury.

We claim:
1. Process for preparing 2,5-dienoic acids and the esters thereof having the general formula

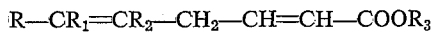

in which R is selected from the group consisting of hydrogen, a hydrocarbon radical from 1 to 20 carbon atoms and an aliphatic radical from 1 to 20 carbon atoms and carrying as substituents inert under the reaction conditions a radical free from olefinic, acetylenic bonds, or hydroxyl groups, $R_1$ and $R_2$ each is selected from the group consisting of hydrogen, an alkyl group from 1 to 5 carbon atoms and a carbocyclic radical having 5 to 6 carbon atoms in the ring, and $R_3$ is selected from the group consisting of a saturated hydrocarbon from 1 to 20 carbon atoms, cycloaliphatic hydrocarbon of 5 to 6 carbon atoms in the ring having a total of 20 carbon atoms, and araliphatic radical with 6 carbon atoms in the ring and a total of up to 20 carbon atoms and hydrogen, which comprises reacting chlorocarbonic esters having the general formula

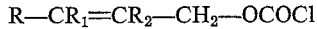

in which R, $R_1$, and $R_2$ have the meaning defined above, at a temperature of 10° to 80° C. with carbon monoxide, acetylene and a hydroxyl compound of the formula $R_3OH$ in which $R_3$ has the meaning defined above, in the presence of at least one catalyst selected from the group consisting of nickel carbonyl and finely divided nickel.

2. The process of claim 1, which comprises carrying out the reaction at a temperature in the range of from 20 to 60° C.

3. The process of claim 1, which comprises using 0.02–0.3 mol of nickel carbonyl for one mol of chlorocarbonic ester.

4. The process of claim 3, which comprises using 0.05–0.2 mol of nickel carbonyl for one mol of chlorocarbonic ester.

5. The process of claim 1, which comprises using carbon monoxide and acetylene each in an excess of at least 20% by weight, calculated on the amount of chlorocarbonic ester used.

6. The process of claim 1, wherein the ratio by volume of carbon monoxide and acetylene in the range of from 10:6 to 10:10 parts.

7. The process of claim 1, which comprises using the hydroxyl compound in an excess of at least 50% by weight, calculated on the amount of chlorocarbonic ester used.

8. The process of claim 1, which comprises carrying out the reaction in a reaction inert solvent.

References Cited

UNITED STATES PATENTS

| | | | |
|---|---|---|---|
| 3,110,725 | 11/1963 | Chiusoli | 260—486 X |
| 3,146,256 | 8/1964 | Chiusoli | 260—464 |

OTHER REFERENCES

J. Am. Chem. Soc., 61, 3176–3180 (1939), Choppin et al., "The Homogeneous Decomposition of Ethyl Chlorocarbonate."

Doshisha Kogaku Kaishi, 8, 24–31 (1957), Nakonishi, "Organic fluorine Compounds VII" as Abstract in C.A. 54, 24, 455.

NICHOLAS S. RIZZO, *Primary Examiner.*

F. A. MIKA, *Assistant Examiner.*